Figure 1:
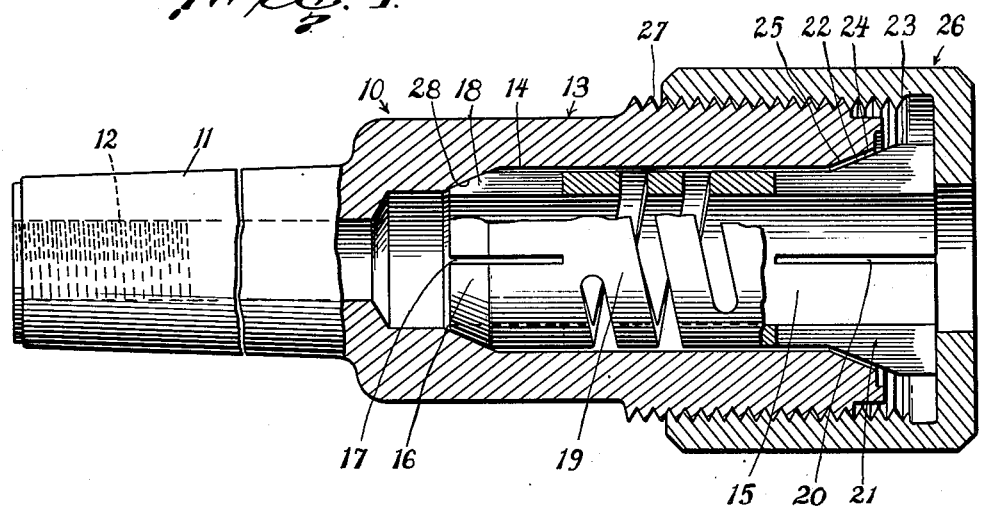

May 12, 1942.　　　R. J. S. PIGOTT　　　2,282,674
CHUCK
Filed Oct. 24, 1940

Inventor
Reginald J. S. Pigott,
By A. M. Houghton
Attorney

Patented May 12, 1942

2,282,674

UNITED STATES PATENT OFFICE 2,282,674

CHUCK

Reginald J. S. Pigott, Pittsburgh, Pa., assignor to Gulf Research & Development Company, Pittsburgh, Pa., a corporation of Delaware Application October 24, 1940, Serial No. 362,650

5 Claims. (Cl. 279—46)

This invention relates to chucks; and it comprises, in a collet chuck, a body member having an axial bore, a tapered inner seat in the body member and a tapered outer seat adjacent the end of the body member, a work-holding collet in the bore having tapered jaw portions adapted to engage the inner seat, tapered jaw portions adapted to engage the outer seat and an axially yieldable section between said jaws, and means for forcing the tapered jaws against the seats; all as more fully hereinafter set forth and as claimed.

Collet chucks are used on lathes and other metal-working machinery for holding round bars and other round work pieces, with higher accuracy of position than jaw-chucks. The conventional collet chuck includes a one-piece tubular member, split at the end to form springy jaws, and means for compressing the jaws on the bar, rod, etc. to be machined; that is, the "work." If the work is just the right diameter to fit the chuck, centering is accurate and the grip is firm. But if the work is more than a trifle undersize or if its diameter is not uniform along is length, centering is imperfect and wobbling is permitted, as the work is held at only one point (or more correctly at one narrow annular area) along its length and the inner end is free to move radially with respect to the chuck. Attempts have been made to provide collet chucks which grip the work at two spaced points along its length, but most of such chucks fail to provide really accurate centering and firm holding for work that is distinctly off-size, and moreover are unduly complicated and delicate in construction. In some cases centering depends on the maintenance of two or more separate parts, threadedly or otherwise fitted together in detachable relation.

Among the objects of the present invention are the provision of a collet chuck adapted to grip work tightly at two spaced points along its length and to hold the work centered even when undersize; the provision of a collet chuck making use of a double ended collet with spring jaws at each end and an integral resilient section between the ends: the provision of a collet chuck including a body member tapered at two places, and a collet having one tapered end engaging one of said tapers and another tapered end slightly spaced from the other taper, resilient means between the ends and means for compressing the collet whereby said tapered ends are seated successively on the body member seats; and the provision of a collet chuck member having a pair of spaced jaw portions adapted to grip work at axially spaced points, the inner jaw portions providing centering and being compressed under resilient pressure while the outer jaw portions provide gripping for resisting relative rotation and are compressed under positive pressure.

These and other objects are accomplished by the provision of a chuck including in a body member a double collet advantageously unitary in structure and having two springy jaw portions and an intermediate coil spring portion, the ends being tapered to engage seats in the body member and advantageously so spaced that the inner end engages its seat slightly before the outer end on tightening the chuck. The inner jaws assure centering; the outer jaws are relied on for driving the work. The chuck is capable of performing the required functions, that is to say accurate centering and firm wobble-free grip of the work, even with undersize work. At the same time it is simple and foolproof; it need comprise only three pieces, and is readily manufactured.

In the accompanying drawing there are shown more or less diagrammatically two examples of specific embodiments of apparatus within the purview of the invention. In the drawing, Fig. 1 is a view in central vertical section with some parts in elevation of one form of the chuck, and Fig. 2 is a similar view of a modified form especially useful for small work.

Figure 2:
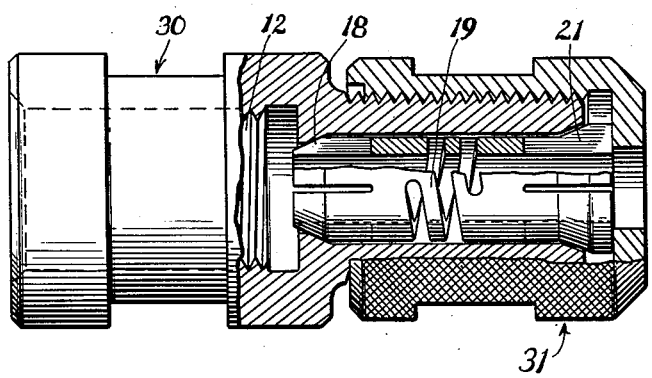

Referring to the drawing, Fig. 1 shows one form of the collet chuck including a chuck body 10 shown as having a conventional tubular tapered shank portion 11 threaded at the inner end at 12, and comprising a head 13 bored at 14 for reception of an inserted collet of unitary nature, having a uniform bore 15 and an inner end portion tapered at 16 and slotted radially at 17, at a plurality of points about its circumference to form jaws 18, so that the jaws 18 can be compressed slightly for accommodation of work (not shown) of diameter slightly smaller than that of the bore. The jaw portion is joined through a coil spring section 19 to an outer portion slotted at 20 to form jaws 21 and having an enlarged head 23 tapered at 22 with a taper in the same direction and advantageously of the same included angle as taper 16. The insert is long enough so that taper 22 in the disengaged position of the chuck, is slightly spaced at 24 from a corresponding beveled seat 25 in head 13 when taper 16 is seated on its corresponding conical seat 28 in the head. A nut 26 engaging threads 27 on head 13 is provided for tightening the chuck. The spring is most conveniently machined integrally with the jaw portions but can be a separate element if desired. The outer diameter of the collet is slightly smaller than bore 14, as shown, to avoid binding.

The taper of the jaw ends and seats is advantageously about 22½ degrees as shown making the total angle included between opposite walls of each cone about 45 degrees.

In operation, work (not shown) is inserted in the chuck and the nut is tightened. Since the body of the collet is slightly longer than the distance between taper seats 25 and 28, as the nut is pulled down with work inserted in the collet, the pressure seats the inner taper first, centering the work at the inner end. The spring then compresses and applies only a spring loading to this rear taper. Finally, the compression of the spring allows the outer taper to engage and further tightening of the nut then pinches down the outer split jaws, firmly gripping and centering the work at the outer end. The rear taper being engaged by spring pressure centers the work and since each cone has a total included angle of 45 degrees, the work can be firmly held as regards radial movement with very little axial pressure. When the axial pressure is relieved the jaws of the collet readily disengage from the seats. The driving grip is furnished by the contraction of the outer conical jaw portion, which can be made as solid as necessary to drive the work properly. The work is gripped at two points spaced apart both of which are accurately centered by cones in the single body which remains in perfect alignment with the head stock spindle. Work which is distinctly undersize, say several thousandths undersize in half-inch diameter stock, can be centered perfectly firmly with the chuck without danger of wobble. Even slightly tapered work can be firmly centered and held.

The relative proportions of the several parts can be varied at will to meet particular requirements. In Fig. 2 is shown a modification especially useful for small work. The collet chuck includes a short threaded collar member 30 containing a collet similar to that of Fig. 1, tightened by a knurled nut 31, and functions similarly to the device of Fig. 1.

The chuck is embodied in steel or other suitable material. Both cones for guiding the collet (i. e. both seats 25 and 28) are advantageously formed in a single member, as shown; thus there is no chance for misalinement of the seats. No loose or untightened fit is involved in the tightening of the collet and no threaded members are used for centering. In use, high concentricity can readily be maintained; a runout of less than 0.0001 or 0.0002 inch can easily be maintained. The grinding or other finishing of the seats can be, and is best done in one operation to achieve perfect concentricity of these surfaces. The corresponding seats on the collet are also conveniently ground in one operation, before cutting the helical slot. If desired the final finishing of the seats can be done after heat-treatment. The slots of the collet can also be cut after hardening if desired, though this is not necessary. The nut plays no part in centering the work and requires no special precision.

Since the collet can have any desired internal dimensions while retaining the same outside dimensions, several different collets can be used interchangeably in the same body member to accommodate work of different diameter.

What I claim is:

1. In a collet chuck, a body member having an axial bore, a conical seat within the member and open to said bore and a conical seat adjacent an end of the member, a unitary work-holding member in the bore having end jaw portions tapered to fit said seats and an intermediate helical coil spring portion, and means for compressing said work-holding member against said seats.

2. In a collet chuck, a body member having an axial bore, a tapered seat adjacent an end of the body member and a second tapered seat within the body member axially spaced from said first seat, an axially bored collet within the bore, having tapered radially flexible jaw portions adapted to engage said seats and a portion intermediate said jaw portions of a substantial degree of resiliency in the axial direction and of such length that in the absence of axial compressive force the outer tapered jaw portion slightly clears the outer seat when the inner jaw portion touches the inner seat, and means engaging the body member and an end of the collet for axially compressing the collet; whereby the inner jaw portion is forced against its seat under resilient pressure while the outer jaw portion is forced against its seat by said compressing means.

3. In a collet chuck, an axially bored collet having outside-tapered radially flexible jaw portions and a helical coil spring portion intermediate said jaw portions having a substantial degree of resiliency in the axial direction so as to shorten appreciably under moderate axial load, and axially bored body means surrounding the collet and provided with two tapered seats adapted to engage said tapered jaw portions; said body means including a tightening member adapted on operation thereof to shorten the collet and cause the jaw portions thereof to contract radially.

4. A collet chuck comprising a unitary body member having an axial bore, a tapered seat adjacent an end of the body member and a second tapered seat within the body member axially spaced from said first seat, an axially bored collet within the bore, having tapered radially flexible jaw portions adapted to engage said seats and a spring portion intermediate said jaw portions and unitary therewith, the spring portion having a substantial degree of resiliency in the axial direction and being of such length that in the absence of axial compressive force the outer tapered jaw portion slightly clears the outer seat when the inner jaw portion touches the inner seat, and means engaging the collet for compressing the collet axially; whereby the inner jaw portion is forced against its seat under resilient pressure of the spring portion while the outer jaw portion is forced against its seat by said compressing means.

5. A collet comprising a tubular element slotted adjacent each end through the walls thereof to define a plurality of jaws adjacent each end, and helically slotted through the walls, in a region intermediate said ends, to define a coil-spring portion whereby to render the collet axially flexible.

REGINALD J. S. PIGOTT.